(12) United States Patent
Oka (10) Patent No.: US 11,683,429 B2
(45) Date of Patent: Jun. 20, 2023

(54) IMAGE SCANNING APPARATUS (71) Applicant: CANON KABUSHIKI KAISHA, Tokyo (JP)

(72) Inventor: Yushi Oka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/836,851

(22) Filed: Jun. 9, 2022

(65) Prior Publication Data

US 2022/0407973 A1 Dec. 22, 2022

(30) Foreign Application Priority Data

Jun. 16, 2021 (JP) ................................ 2021-099949

(51) Int. Cl.
*H04N 1/00* (2006.01)
(52) U.S. Cl.
CPC ..... *H04N 1/00774* (2013.01); *H04N 1/00602* (2013.01); *H04N 1/00689* (2013.01)
(58) Field of Classification Search
CPC ........... G03G 15/0194; G03G 15/5008; G03G 2215/0158; G03G 2215/0119; G03G 15/757; G03G 15/0131; G03G 2215/0129; G03G 2215/0132; G03G 2215/0141; G03G 2221/1657; G03G 15/08; G03G 15/0875; G03G 2215/0161; G03G 15/0868; G03G 15/1615; G03G 2215/068; G03G 15/0865; G03G 15/0877; G03G 15/0886; G03G 15/01; G03G 15/0855; G03G 15/16; G03G 2215/00075; G03G 2215/0008; G03G 15/50; G03G 21/186; G03G 15/0189; G03G 15/5058; G03G 15/6567; G03G 2215/00156; G03G 2215/0106; G03G 2215/0154; G03G 2215/0668; G03G 2215/0692; G03G 2215/1623; G03G 15/0806; G03G 15/161; G03G 21/1857; G03G 2215/00059; G03G 2215/0148;
(Continued)

(56) References Cited

U.S. PATENT DOCUMENTS 7,621,519 B2 * 11/2009 Sagawa ..................... B65H 5/36
271/4.01
7,690,650 B2 * 4/2010 Itoh .......................... B65H 7/12
271/262

(Continued)

*Primary Examiner* — Negussie Worku
(74) *Attorney, Agent, or Firm* — Canon U.S.A., Inc. I.P. Division (57) ABSTRACT

An image scanning apparatus includes a sheet loading unit, a pickup roller, a first conveying roller, a detecting unit, a first stepping motor, a second conveying roller, a second stepping motor, a scanning unit, and a control unit that starts driving of the second stepping motor after performing phase matching of the second stepping motor. The control unit starts driving of the first stepping motor without performing phase matching of the first stepping motor. When an instruction to start scanning is input, the control unit starts the phase matching of the second stepping motor. When the detecting unit detects the document, the control unit starts driving of the first stepping motor after completion of the phase matching of the second stepping motor. When the detecting unit detects no document, the control unit starts driving of the first stepping motor before completion of the phase matching of the second stepping motor.

4 Claims, 7 Drawing Sheets

(58) Field of Classification Search
CPC ....... G03G 2215/1657; G03G 15/0136; G03G 15/0872; G03G 15/5004; G03G 15/5054; G03G 15/751; G03G 15/754; G03G 2215/00054; G03G 2215/0174; G03G 2215/0685; G03G 15/0121; G03G 15/0152; G03G 15/0173; G03G 15/04054; G03G 15/0808; G03G 15/0884; G03G 15/2053; G03G 15/505; G03G 15/55; G03G 15/60; G03G 15/6511; G03G 21/1633; G03G 21/1638; G03G 21/1647; G03G 21/1814; G03G 21/1821; G03G 21/1864; G03G 2215/00383; G03G 2215/00396; G03G 2215/0164; G03G 2215/0665; G03G 2221/1654; G03G 2221/1672; H04N 2221/04732; H04N 1/506; H04N 2201/04755; H04N 2201/02416; H04N 2201/02439; H04N 2201/0471; H04N 2201/04731; H04N 2201/04794; H04N 1/02815; H04N 1/053; H04N 1/1135; H04N 13/341; H04N 13/363; H04N 13/398; H04N 2201/04791; H04N 1/00774; H04N 1/00795; H04N 1/00814; H04N 1/0288; H04N 1/0473; H04N 1/12; H04N 2201/0404; H04N 2201/0418; H04N 2201/0448; H04N 2201/04703; H04N 2201/04744; H04N 5/783; H04N 1/00602; H04N 1/00689; H04N 1/047; H04N 1/192; H04N 1/203; H04N 1/2032; H04N 1/36; H04N 13/359; H04N 2201/04786; H04N 2201/04789; H04N 5/78263; H04N 9/8042; H04N 9/8227; H04N 9/893; H04N 1/00018; H04N 1/00037; H04N 1/00058; H04N 1/00082; H04N 1/00092; H04N 1/00281; H04N 1/00488; H04N 1/00562; H04N 1/00567; H04N 1/0057; H04N 1/0058; H04N 1/00612; H04N 1/00615; H04N 1/0062; H04N 1/00623; H04N 1/00631; H04N 1/00647; H04N 1/00694; H04N 1/00742; H04N 1/00787; H04N 1/00798; H04N 1/00986; H04N 1/028; H04N 1/0283; H04N 1/04; H04N 1/06; H04N 1/0678; H04N 1/1026; H04N 1/1205; H04N 1/1215; H04N 1/1235; H04N 1/125; H04N 1/127; H04N 1/1285; H04N 1/2036; H04N 1/2038; H04N 1/33323; H04N 1/33346; H04N 1/4078; H04N 1/415; H04N 1/46; H04N 1/508; H04N 2005/745; H04N 2201/0094; H04N 2201/03108; H04N 2201/04722; H04N 2201/04724; H04N 2201/04727; H04N 2201/04729; H04N 2201/04734; H04N 2201/04756; H04N 2201/3335; H04N 2201/33371; H04N 2201/33378; H04N 2201/33392; H04N 5/937; H04N 9/3105; H04N 9/3117; H04N 9/3147; B65H 1/14; B65H 2513/512; B65H 2555/26; B65H 2557/33; B65H 2801/06; B65H 7/20; B65H 2511/20; B65H 2513/10; B65H 2513/51; B65H 2557/242; B65H 3/0669; B65H 5/062; B65H 1/266; B65H 2220/01; B65H 2220/02; B65H 2220/11; B65H 2403/514; B65H 2403/721; B65H 2403/942; B65H 2405/313; B65H 2511/51; B65H 2511/515; B65H 2557/32; B65H 7/02; B65H 83/025; B65H 2301/3122; B65H 2301/42242; B65H 2301/43821; B65H 2404/1114; B65H 2404/6111; B65H 2405/3321; B65H 2701/19; B65H 2801/27; B65H 3/0607; B65H 31/32; B65H 31/36; B65H 39/00; B65H 43/00
USPC ......................................................... 358/498
See application file for complete search history.

(56) References Cited

U.S. PATENT DOCUMENTS

| | | | |
|---|---|---|---|
| 7,782,504 B2 * | 8/2010 | Okubo | H04N 1/00602 |
| | | | 399/361 |
| 2007/0246879 A1 * | 10/2007 | Sagawa | G03G 15/6529 |
| | | | 271/12 |
| 2017/0320688 A1 * | 11/2017 | Nishizawa | B65H 7/02 |
| 2018/0227448 A1 * | 8/2018 | Nito | H02P 21/0089 |
| 2018/0358913 A1 | 12/2018 | Ogihara | |
| 2019/0158691 A1 * | 5/2019 | Nito | G03G 15/6573 |
| 2020/0186660 A1 * | 6/2020 | Nito | H04N 1/00602 |
| 2021/0400157 A1 * | 12/2021 | Nito | H04N 1/00652 |

* cited by examiner

IMAGE SCANNING APPARATUS

BACKGROUND

Field

The present disclosure relates to an image scanning apparatus that scans images on a conveyed document.

Description of the Related Art

An image scanning apparatus applies light onto a document, scans reflected light with a scanning unit, and detects the reflected light via a glass to scan the image on the document. An example of the image scanning apparatus scans a document conveyed by an automatic document feeder (ADF) with a scanning unit.

U.S. Patent Application Publication No. 2018/0358913 describes a configuration in which a stepping motor is used to drive a conveying roller that conveys sheets. U.S. Patent Application Publication No. 2018/0358913 describes a configuration in which the phases of rotors are brought to desired phases (phase matching) by switching the excitation phase of the motor before starting driving of the motor, and then the driving of the motor is started.

In document feeding apparatuses, the tension of a tension belt that transmits the driving force of a motor that drives a conveying roller conveying a document in scanning the document to the conveying roller is relatively large. This is to prevent the conveying roller from vibrating or fluctuating in speed while scanning the document. The larger the tension of the tension belt, the larger the degradation of the tension belt. For this reason, the tension of a tension belt that transmits the driving force of a motor that drives the conveying roller to conveying rollers (a pickup roller and a separation roller) that have little effect on the conveyance of the document while scanning the document is relatively small.

It is known that, if the load driven by the motor is relatively small, the driving of the motor can be started without phase matching. In other words, it is known that the time from input of a scanning instruction to feeding of a document can be decreased by starting driving of a motor that drives a pickup roller or a separation roller without phase matching. A motor that drives the conveying roller downstream from the separation roller needs phase matching.

Figure 7:
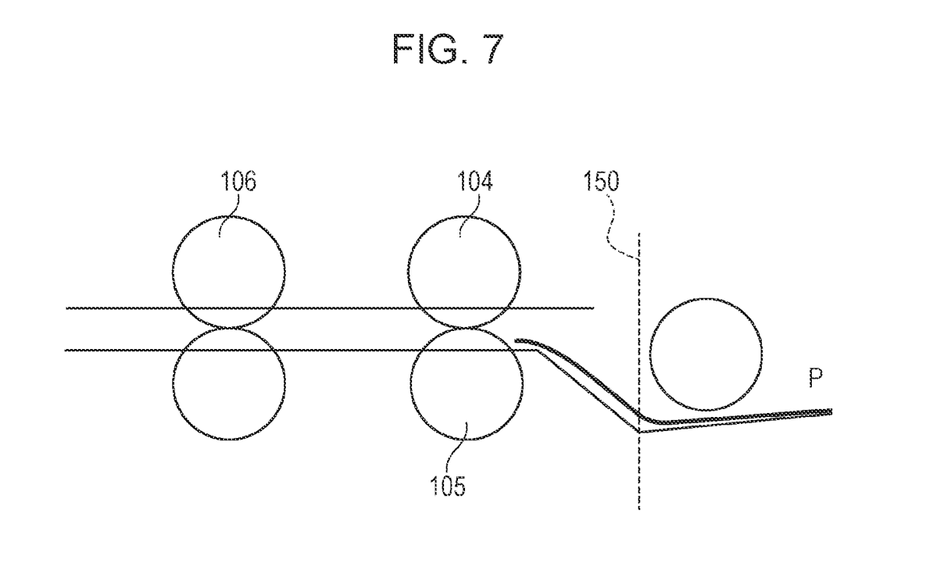
FIG. 7 is a diagram illustrating a state in which feeding of the document is stopped because of a jam while the document is being scanned.

FIG. 7 is a diagram illustrating a state in which feeding of the document P is stopped because of a jam while the document P is being scanned. At the start of the document scanning job, the leading end of the document P is at position 150. However, if the document P feeding is stopped because of a jam during the scanning of the document P, the leading end of the document P fed by the pickup roller may be positioned between the separation roller 104 and the pickup roller 103 (downstream from the position 150). If driving of the motor that drives the pickup roller 103 or the separation roller 104 is started without performing phase matching, the leading end of the document P may reach the conveying roller 106 before the phase matching of the motor that drives the conveying roller 106 is completed. This can lose the steps of the motor that drives the conveying roller 106 or cause a jam.

SUMMARY

Accordingly, the present disclosure reduces the occurrence of a jam.

According to an aspect of the present disclosure, an image scanning apparatus includes a sheet loading unit on which a document is to be loaded, a pickup roller configured to feed the document loaded on the sheet loading unit, a first conveying roller located downstream from the pickup roller in a conveying direction in which the document is conveyed and adjacent to the pickup roller, a detecting unit disposed between the pickup roller and the first conveying roller and configured to detect the document, a first stepping motor including a rotor and configured to drive the pickup roller and the first conveying roller, a second conveying roller disposed downstream from the first conveying roller in the conveying direction, a second stepping motor including a rotor and configured to drive the second conveying roller, a scanning unit configured to scan an image on the document conveyed by the second conveying roller, and a control unit configured to start driving of the second stepping motor after performing phase matching of the rotor of the second stepping motor, and configured to start driving of the first stepping motor without performing phase matching of the rotor of the first stepping motor, wherein, when an instruction to start scanning of the image on the document using the scanning unit is input, the control unit starts the phase matching of the second stepping motor, and wherein, when the detecting unit detects the document, the control unit starts driving of the first stepping motor after completion of the phase matching of the second stepping motor, and when the detecting unit detects no document, the control unit starts driving of the first stepping motor before completion of the phase matching of the second stepping motor.

Further features of the present disclosure will become apparent from the following description of exemplary embodiments with reference to the attached drawings.

DESCRIPTION OF THE EMBODIMENTS

Embodiments of the present disclosure will be described hereinbelow with reference to the drawings. It is to be understood that the shapes and relative positions of the components described in the embodiments can be changed as appropriate according to the configuration of the apparatus to which the present disclosure is applied and various conditions, and the scope of the present disclosure is not limited to the embodiments.

First Embodiment

Image Scanning Apparatus

Figure 1:
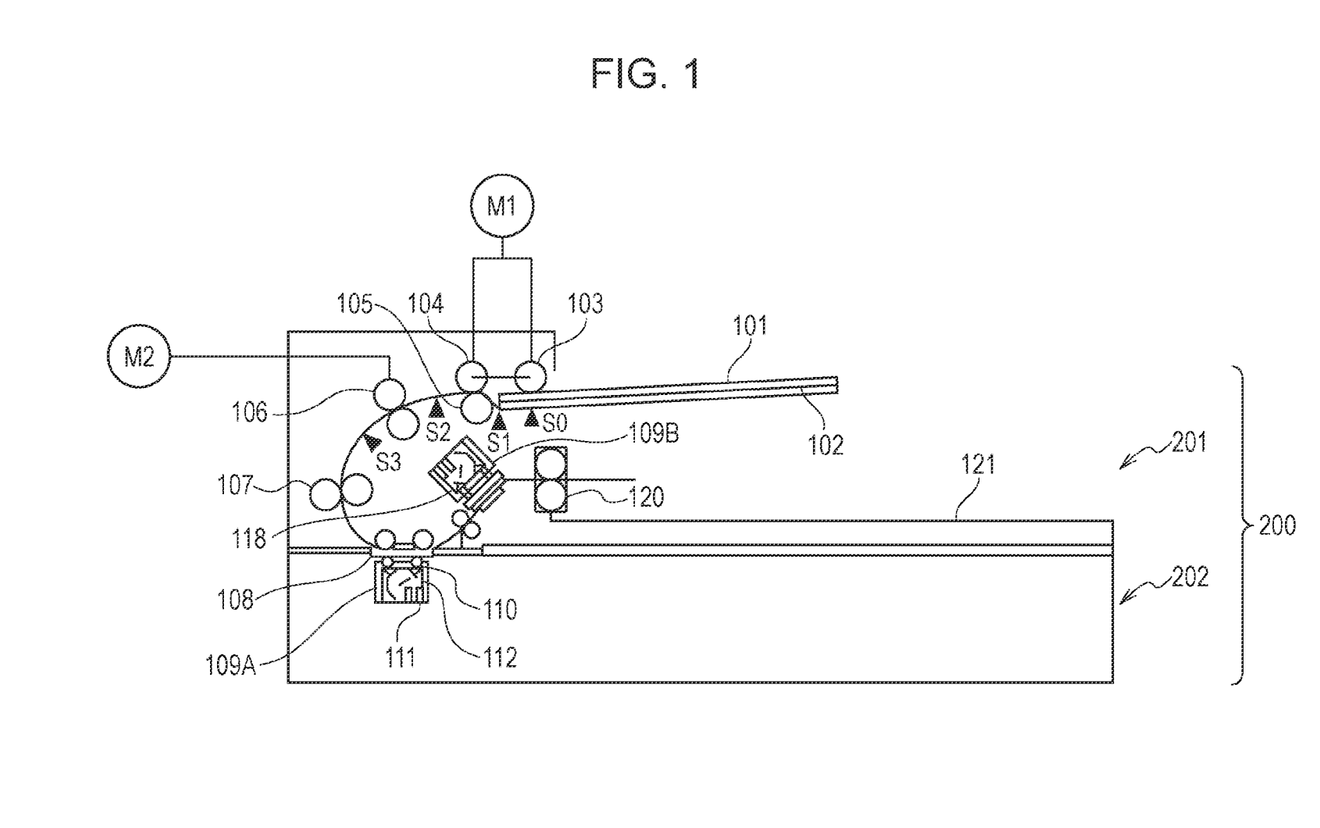
FIG. 1 is a cross-sectional view of an image scanning apparatus according to a first embodiment of the present disclosure.

FIG. 1 is a cross-sectional view of an image scanning apparatus 200 including a document feeding apparatus 201 and a scanning apparatus 202. The document feeding apparatus 201 is rotatable about the scanning apparatus 202.

A pickup roller 103 serving as a feeding unit feeds documents 101 loaded on a tray 102 serving as a sheet loading unit into the document feeding apparatus 201. The separation rollers 104 and 105 are provided to prevent the plurality of documents 101 from being fed at the same time by the pickup roller 103. The separation rollers 104 and 105 are disposed next to the pickup roller 103. The pickup roller 103 and the separation roller 104 are driven by a motor M1. The tray 102 is provided with a sensor S0 for detecting whether the documents 101 are loaded on the tray 102.

The rotation shaft of the pickup roller 103 connects to the rotation shaft of the separation roller 104 with a swing arm. The pickup roller 103 can be moved by the swing arm between a retracted position at which the pickup roller 103 is not in contact with the document 101 on the tray 102 and a contact position at which the pickup roller 103 comes into contact with the document 101 on the tray 102. The swing arm is driven by a motor (not shown).

The document 101 fed to a conveying path is conveyed by conveying rollers 106 and 107.

The conveying roller 106 is driven by a motor M2.

A sensor S1 is provided between the pickup roller 103 and the separation roller 104. A sensor S2 is provided between the separation roller 104 and the conveying roller 106. A sensor S3 is provided between the conveying roller 106 and the conveying roller 107. The sensors S1, S2, and S3 will be described later.

A transparent glass 108 is disposed at a scanning position. A scanning unit 109A is provided on the opposite side of the glass 108 from the conveying path. The scanning unit 109A includes a light emitting diode (LED) 110, an image sensor 111, and an optical component group 112. The image sensor 111 includes a plurality of pixels that receives red (R) light, green light (G), and blue (B) light in the main scanning direction.

The scanning unit 109A scans an image on the front (a first surface) of the document 101 as follows.

Figure 2:
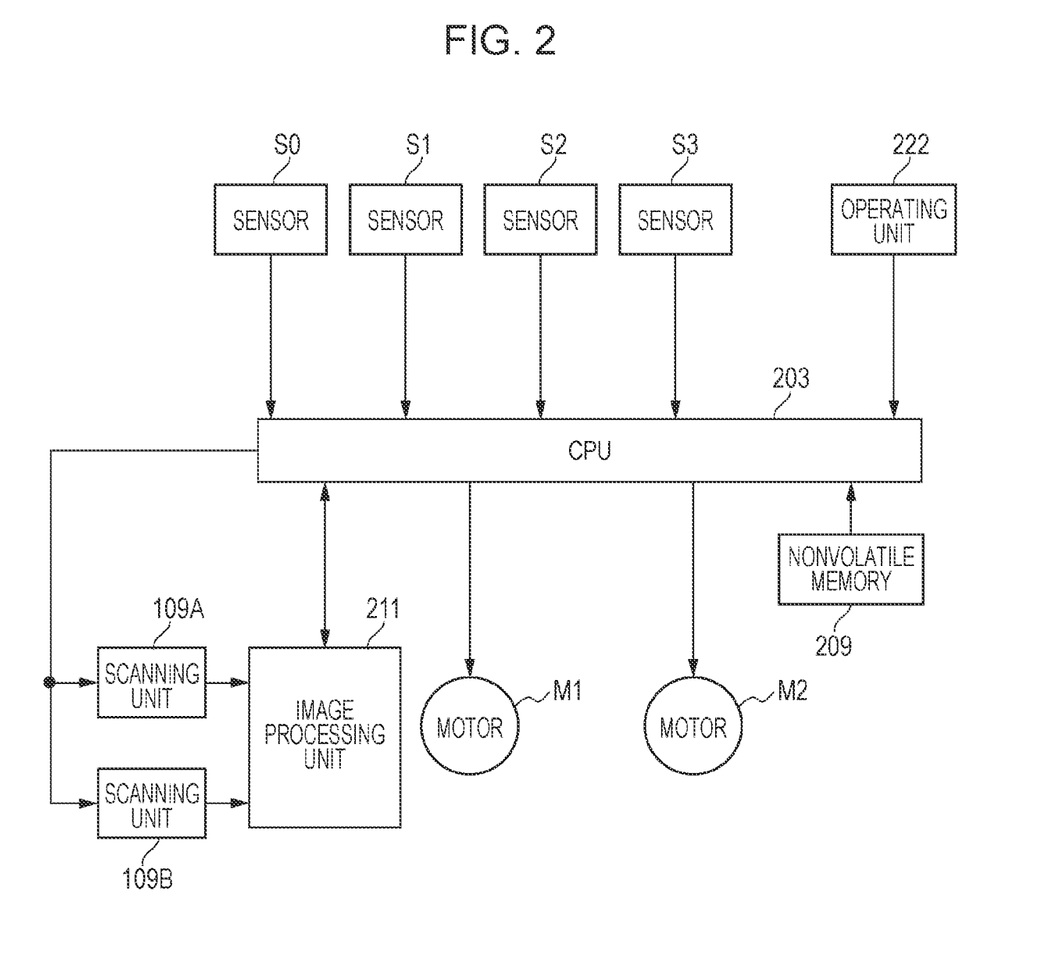
FIG. 2 is a block diagram illustrating the control configuration of the image scanning apparatus of the first embodiment.

Specifically, the LED 110 serving as a light source applies (emits) light onto the surface of the document 101 through the glass 108. The optical component group 112 guides the light reflected from the document 101 through the glass 108 to the image sensor 111. The image sensor 111 outputs analog image data on the basis of the received reflected light. The image sensor 111 scans a line of images in the main scanning direction at the same time. Accordingly, the image sensor 111 can output image data of the entire document 101 by scanning a line of images a plurality of times with the image sensor 111 while the document 101 is being conveyed. An analog-to-digital (A/D) converting unit (not shown) of the scanning unit 109A converts the analog image data to digital image data and outputs the digital image data to an image processing unit 211 (FIG. 2).

The document 101 that has passed through the scanning position of the scanning unit 109A is conveyed to the scanning position of a scanning unit 109B. A transparent glass 118 is disposed at the scanning position of the scanning unit 109B. The scanning unit 109B is disposed on the opposite side of the glass 118 from the conveying path. The scanning unit 109B has the same configuration as that of the scanning unit 109A. The scanning unit 109B scans images on the back (a second surface) of the document 101.

The document 101 that has passed through the scanning position of the scanning unit 109B is discharged to an output tray 121 by a sheet discharge roller 120.

Control Configuration

FIG. 2 is a block diagram illustrating the control configuration of the image scanning apparatus 200.

A central processing unit (CPU) 203 controls the image scanning apparatus 200 by executing programs stored in a nonvolatile memory 209.

The motors M1 and M2 are controlled by the CPU 203 according to the output of the sensors S0, S1, S2, and S3.

An operating unit 222 provides a user interface. The CPU 203 controls the operating unit 222 so that an operating screen for the user to set, for example, the kind of the recording medium to be used, is displayed on the display of the operating unit 222.

The scanning units 109A and 109B output digital image data to the image processing unit 211.

The numerical value of the image data increases with an increasing intensity of the reflected light.

Feeding Operation

FIGS. 3A to 3D are diagrams illustrating how the document P is fed. When an instruction to start scanning of the images on the document P is input from the operating unit 222, the pickup roller 103 at the retracted position is moved to the contact position shown in FIG. 3A by the CPU 203. When the document P is placed on the tray 102, the leading end is located at the position 150.

Figure 3A:
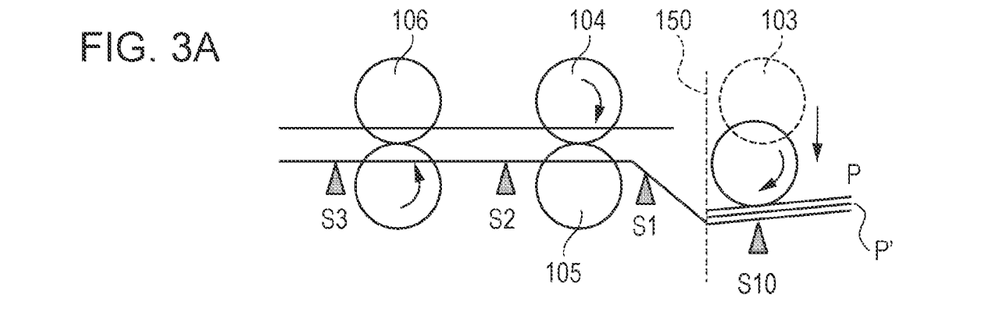
FIGS. 3A to 3D are diagrams illustrating how a document is fed.
Figure 3B:
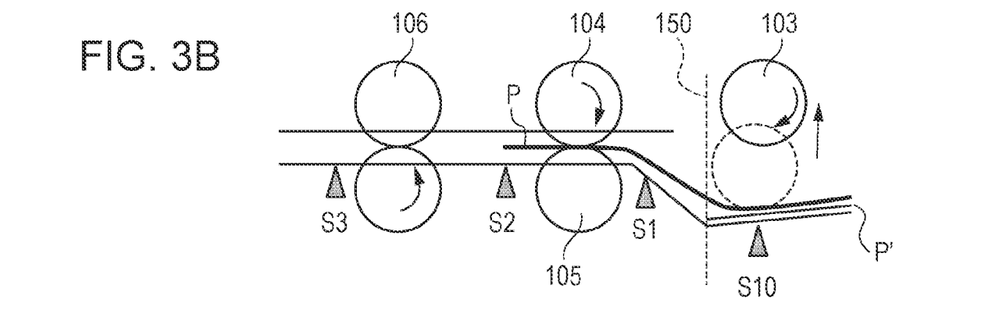

When the leading end of the document P fed by the pickup roller 103 is detected by the sensor S2, as shown in FIG. 3B, the CPU 203 moves the pickup roller 103 to the retracted position.

Figure 3C:
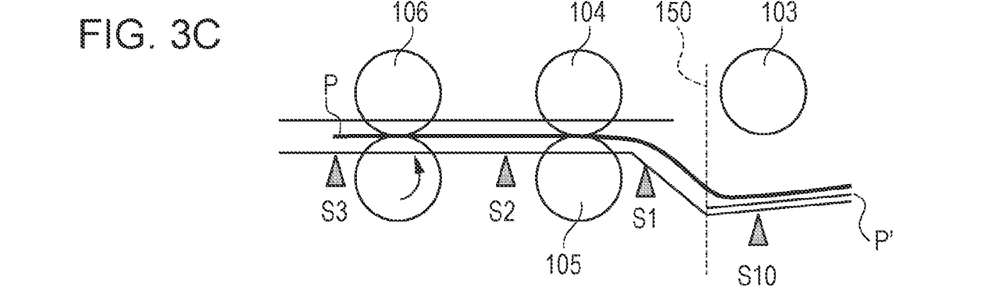

Thereafter, the document P is conveyed to the conveying roller 106 by the separation roller 104. When the leading end of the document P is detected by the sensor S3, the CPU 203 stops the motor M1. In other words, the driving of the pickup roller 103 and the separation roller 104 is stopped, as shown in FIG. 3C. The separation roller 104 includes a one-way clutch, which is taken round by the document P conveyed by the conveying roller 106 after the motor M1 is stopped.

Figure 3D:
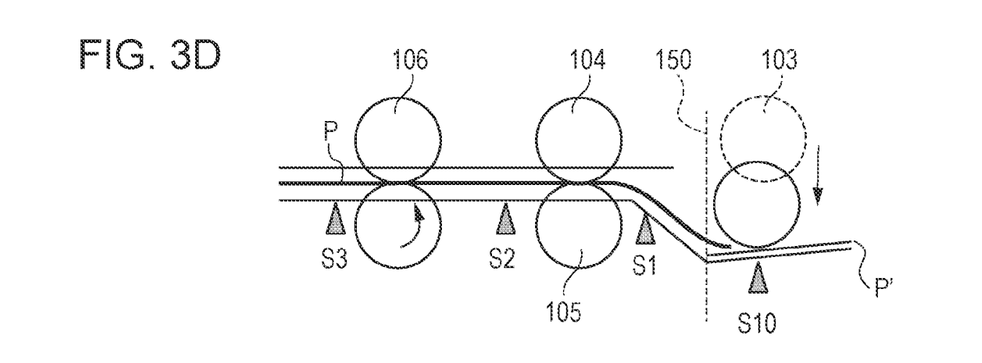

When a predetermined time has passed after the leading end of the document P is detected by the sensor S3, as shown in FIG. 3D, the CPU 203 moves the pickup roller 103 to the contact position.

Thereafter, when the trailing end of the document P passes through the sensor S1, the CPU 203 starts driving of the motor M1. In other words, feeding of a document P' following the document P is started.

Figure 4A:
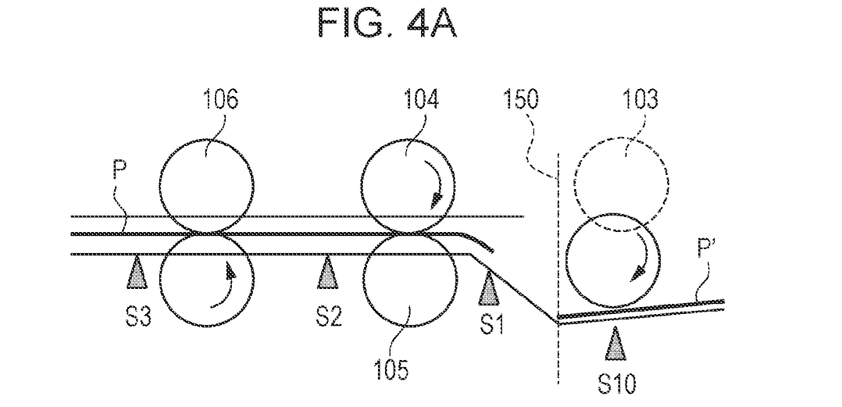
FIGS. 4A to 4C are diagram illustrating how a document following the document is fed.
Figure 4B:
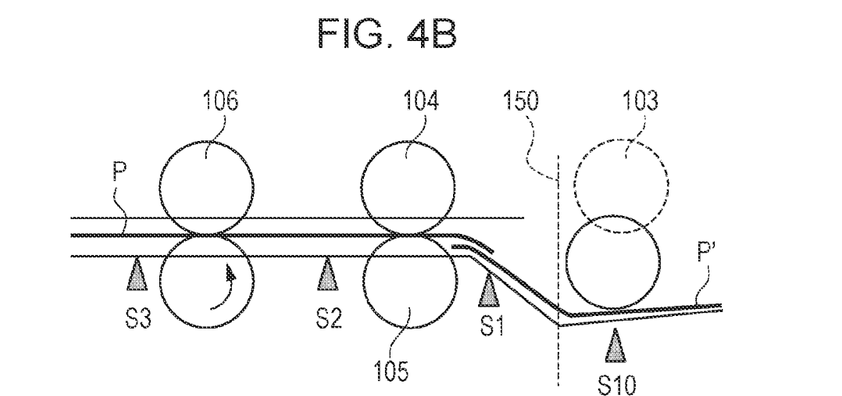
Figure 4C:
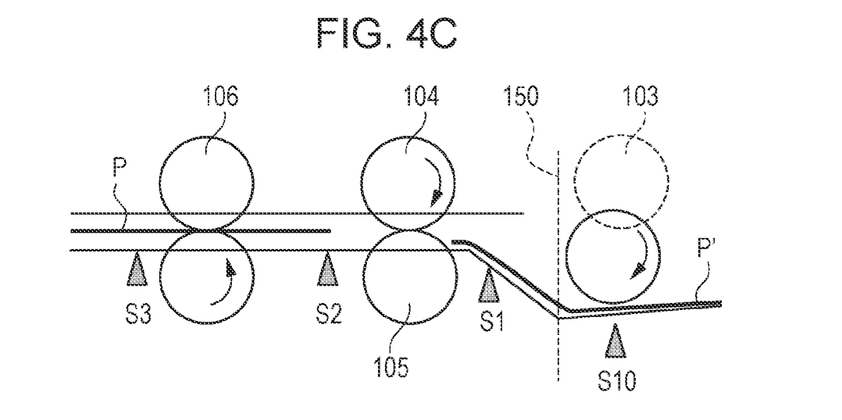

FIGS. 4A to 4C are diagram illustrating how the document P' following the document P is fed. In a state in which the leading end of the document P' is at the position 150, the passage of the trailing end of the document P through the sensor S1 is detected, as shown in FIG. 4A. When the document P' is moved in the conveying direction by the force of friction with the fed document P, the sensor S1 detects the document P' even when the trailing end of the document P has passed through the sensor S1, as shown in FIG. 4B. In this case, when the trailing end of the document P has passed through the sensor S2, as shown in FIG. 4C, the CPU 203 starts driving of the motor M1.

In other words, feeding of the document P' following the document P is started. In other words, when one of the sensors S1 and S2 detects a change in the document P from "present" to "absent", the CPU 203 starts driving of the motor M1.

Starting Motor

FIGS. 5A to 5F are structural diagrams of a stepping motor employed for the motors M1 and M2. A stator 805 is disposed so as to surround the periphery of a rotor 806. The stator 805 includes stator poles (hereinafter referred to as poles) 801, 802, 803, and 804, around each of which a coil is wound. An A-phase coil is wound around the pole 801, and an /A-phase coil is wound around the pole 803. A B-phase coil is wound around the pole 802, and a /B-phase coil is wound around the pole 804.

Figure 5A:
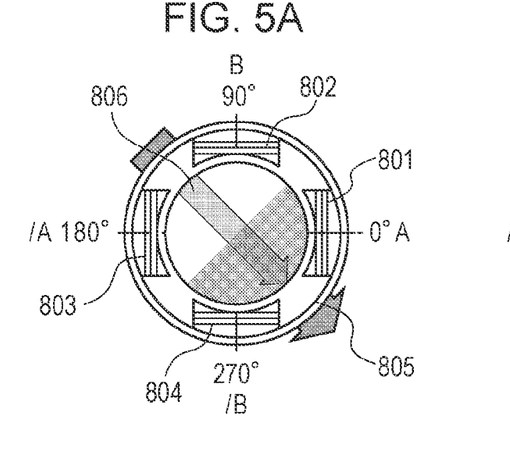
FIGS. 5A to 5F are structural diagrams of a stepping motor employed for motors.

When an electrical current is passed through A-phase, the pole 801 corresponding to the A-phase is excited, and when a reverse electrical current is passed through the A-phase, the pole 803 corresponding to /A-phase is excited.

When an electrical current is passed through B-phase, the pole 802 corresponding to the B-phase is excited, and when a reverse electrical current is passed through the B-phase, the pole 804 corresponding to /B-phase is excited.

FIG. 5A is a diagram illustrating the initial position of the rotor 806 in a two-phase excitation mode. When the pole 801 in the A-phase and the pole 804 in the /B-phase are excited, the rotor 806 is attracted to the poles 801 and 804 and comes to rest at an intermediate position therebetween. This state is kept for a predetermined time to stabilize the position of the rotor 806. This is referred to as pre-excitation.

Figure 5B:
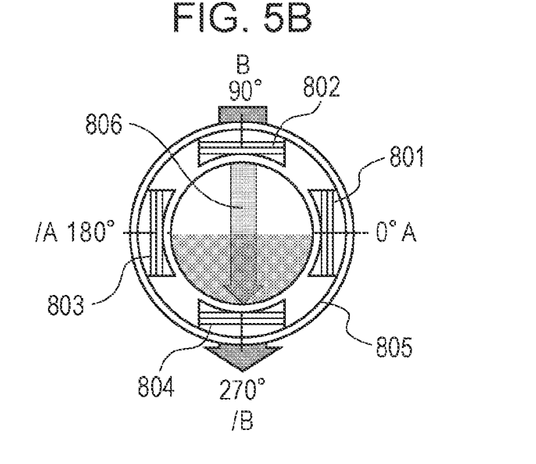
Figure 5C:
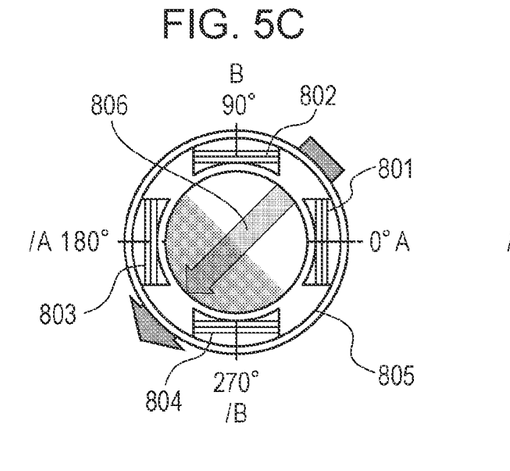

Turning off the excitation of the pole 801 in the A-phase, and exciting the pole 803 corresponding to the /A-phase from this state, as shown in FIG. 5B, attracts the rotor 806 to the pole 804. Subsequently, exciting the pole 804 in the /B-phase and the pole 803 in the /A-phase causes the rotor 806 to be attracted to the pole 804 and the 803, as shown in FIG. 5C.

Figure 5D:
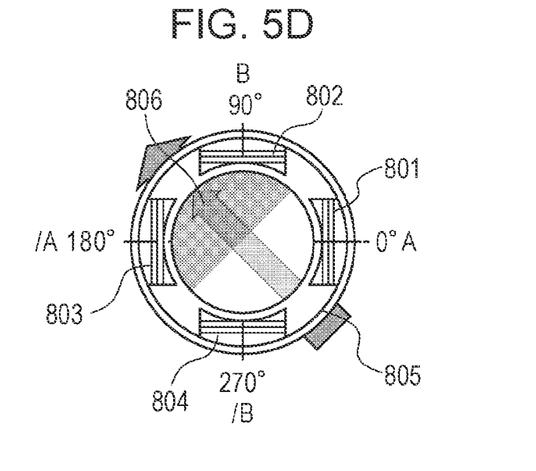
Figure 5E:
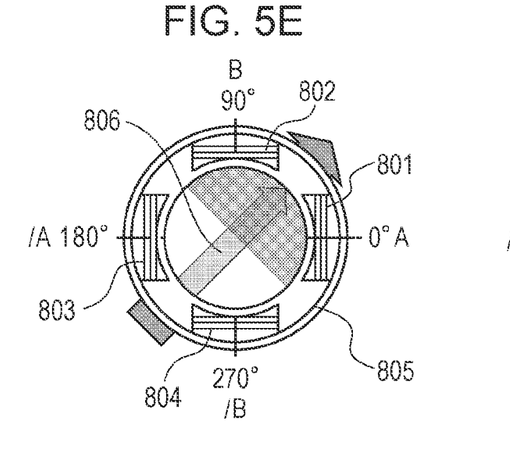

Likewise, exciting the pole 803 in the /A-phase and the pole 802 in the B-phase causes the rotor 806 to be attracted to the poles 803 and 802, as shown in FIG. 5D, and exciting the pole 802 in the B-phase and the pole 801 in the A-phase causes the rotor 806 to be attracted to the poles 802 and 801, as shown in FIG. 5E. Thereafter, the rotor 806 returns to the state shown in FIG. 5A, and exciting the pole 801 in the A-phase and the pole 804 in the /B-phase causes the rotor 806 to be attracted to the poles 801 and 804.

Exciting the coils sequentially by two phases in this way repeats the state from FIG. 5A to FIG. 5E to rotate the rotor 806 clockwise. This excitation pattern is referred to as a two-phase excitation pattern.

In this embodiment, the rotational driving is always started from the state in FIG. 5A. Thus, motor drivers need only excite the poles 801 to 804 always in a determined excitation pattern according to an excitation mode indicated by the CPU 201, so that the configuration of the motor drivers is not complicated. However, the stop of motor driving and the change of the excitation mode are performed at any timing without waiting for the excitation pattern to complete, so that the phase of the rotor 806 with respect to the stator 805 is not always constant. The motor drivers excite the motors M1 and M2 in the excitation pattern, described above when starting the rotational driving of the motors M1 and M2 again after stopping the motor driving regardless of what phase the rotor 806 is stopped in. The stepping motor is started by linearly increasing the frequency of the drive pulse for shifting the excitation pattern from the startup frequency. For this reason, depending on the phase of the rotor 806 at startup, the rotor 806 may be unable to follow the excitation of the stator 805, causing step-out or vibration.

Figure 5F:
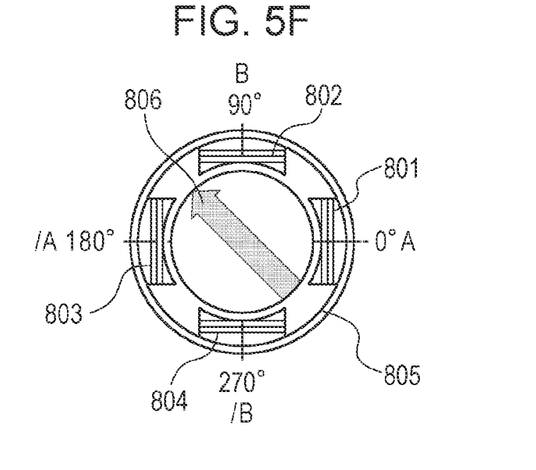

FIG. 5F is a diagram illustrating an example of the phase of the rotor 806 stopped when the rotor 806 is attracted to the poles 803 and 802 by driving the motor M1 or M2 with two-phase excitation to excite the pole 803 in the /A-phase and the pole 802 in the B-phase, as shown in FIG. 5D.

If the rotor 806 is driven to rotate clockwise in the two-phase excitation pattern, described above, from this state, the pole 801 in the A-phase and the pole 804 in the /B-phase are first excited, so that the rotor 806 may be attracted to the poles 801 and 804 into an intermediate position therebetween. However, if the rotor 806 is just in 180° opposite phase, and the tension of a timing belt (not shown) that transmits the driving force of the motor M1 or M2 is high because of the characteristics of the mechanical driving system, the rotor 806 may not move either clockwise or counterclockwise.

When the two-phase excitation pattern, described above, is started from this state, the rotor 806 is attracted to the pole 804 by turning off the excitation of the pole 801 in the A-phase and exciting the pole 803 corresponding to the /A-phase at the same time, as shown in FIG. 5B. Subsequently, when the pole 804 in the /B-phase and the pole 803 in the /A-phase are excited as in FIG. 5C, the rotor 806 is attracted to the poles 804 and 803. As a result, a clockwise force acts on the rotor 806 after a counterclockwise force acts, causing step-out.

To prevent it, this embodiment performs phase matching between the rotor 806 and the stator 805 before starting the stepping motor M1 or M2. The phase matching is the process of executing the pre-excitation, as in FIG. 5A, and then executing the excitation pattern of the next excitation mode, as in FIGS. 5B and 5C, for one cycle, and waiting until the rotor 806 is stabilized again. Thus, the phases of the stator 805 and the rotor 806 are reliably matched in the position next to the excitation start phase corresponding to the next excitation mode (excitation pattern), that is, the phase in FIG. 5C.

In this embodiment, the motor M2 needs motor phase matching because the tension of a timing belt (not shown) for driving the roller from the motor M2 is high, but the motor M1 need not motor phase matching because of the low tension. The timing belt also functions as a belt that transmits the driving force of the motor M1 or M2 to the load. The tension corresponds to the stretching force of the belt.

Figure 6:
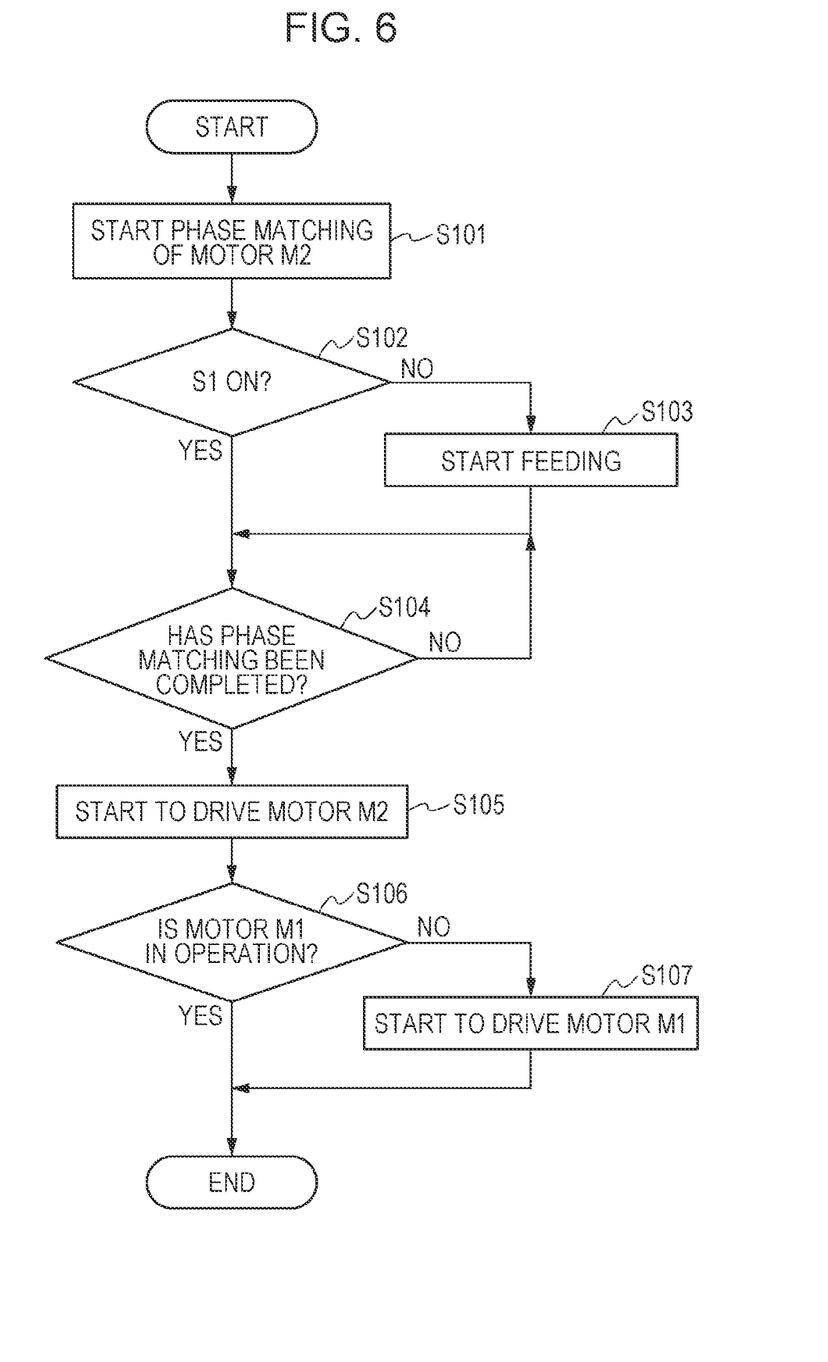
FIG. 6 is a flowchart showing how the motors are started when images on a document conveyed are scanned in this embodiment.

FIG. 6 is a flowchart showing how the motors M1 and M2 are started when images on a document conveyed are scanned in this embodiment. The process of the flowchart shown in FIG. 6 is executed by the CPU 203 when an instruction to scan the images on the conveyed document is input.

In S101, the CPU 203 starts phase matching of the motor M2.

If in S102 the sensor S1 detects a document, then the process goes to S104.

If in S102 the sensor S1 detects no document, then in S103 the CPU 203 starts feeding of the document on the tray 102.

If in S104 the phase matching of the motor M2 is completed, then in S105 the CPU 203 starts driving of the motor M2.

If in S106 the motor M1 is in operation, then the CPU 203 terminates the flowchart.

If in S106 the motor M1 is not in operation, then the CPU 203 starts feeding of the document on the tray 102 and terminates the process of the flowchart.

Thus, in this embodiment, when an instruction to scan the images on the conveyed document is input, the phase matching of the motor M2 is started. If the sensor S1 detects a document, in other words, if the leading end of the document is located between the pickup roller 103 and the separation roller 104, driving of the motor M1 is started (feeding is started) after completion of the phase matching of the motor M2. In contrast, if the sensor S1 detects no document, in other words, if the leading end of the document is located at the position 150, driving of the motor M1 is started (feeding is started) before completion of the phase matching of the motor M2. This allows the time from input of a scanning instruction to document feeding to be reduced and prevents a jam and step-out of the motor M2. If document feeding is started when a scanning instruction is input, the leading end of the document is located at the position 150. In contrast, if a jam has occurred and document feeding is started again after the jam is cleared, the leading end of the document may be located between the pickup roller 103 and the separation roller 104.

In this embodiment, the CPU 203 controls the motors M1 and M2. However, this is given for illustrative purposes only. For example, a motor control unit that controls the motor M1 and a motor control unit that controls the motor M2 may be separately provided, and the motor control unit that controls the motor M1 and the motor control unit that controls the motor M2 may be collectively referred to as "control unit".

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-099949 filed Jun. 16, 2021, which is hereby incorporated by reference herein in its entirety.

What is claimed is:

1. An image scanning apparatus comprising:
   a sheet loading unit on which a document is to be loaded;
   a pickup roller configured to feed the document loaded on the sheet loading unit;
   a first conveying roller located downstream from the pickup roller in a conveying direction in which the document is conveyed and adjacent to the pickup roller;
   a detecting unit disposed between the pickup roller and the first conveying roller and configured to detect the document;
   a first stepping motor including a rotor and configured to drive the pickup roller and the first conveying roller;
   a second conveying roller disposed downstream from the first conveying roller in the conveying direction;
   a second stepping motor including a rotor and configured to drive the second conveying roller;
   a scanning unit configured to scan an image on the document conveyed by the second conveying roller; and
   a control unit configured to start driving of the second stepping motor after performing phase matching of the rotor of the second stepping motor, and configured to start driving of the first stepping motor without performing phase matching of the rotor of the first stepping motor,
   wherein, when an instruction to start scanning of the image on the document using the scanning unit is input, the control unit starts the phase matching of the second stepping motor, and
   wherein, when the detecting unit detects the document, the control unit starts driving of the first stepping motor after completion of the phase matching of the second stepping motor, and when the detecting unit detects no document, the control unit starts driving of the first stepping motor before completion of the phase matching of the second stepping motor.

2. The image scanning apparatus according to claim 1, further comprising:
   a first belt configured to transmit driving force of the first stepping motor to the first conveying roller; and
   a second belt configured to transmit driving force of the second stepping motor to the second conveying roller,
   wherein tension of the first belt is lower than tension of the second belt.

3. The image scanning apparatus according to claim 1, wherein the second conveying roller is adjacent to the second conveying roller.

4. The image scanning apparatus according to claim 1, wherein the control unit performs phase matching of the second stepping motor by supplying an electrical current to a coil of the second stepping motor to cause the rotor of the second stepping motor to be attracted to a first phase and thereafter by supplying an electrical current to the coil of the second stepping motor to cause the rotor of the second stepping motor to be attracted to a second phase.

* * * * *